United States Patent
Axen et al.

(10) Patent No.: US 7,608,187 B2
(45) Date of Patent: Oct. 27, 2009

(54) MANUFACTURE OF A CHROMATOGRAPHY MATRIX

(75) Inventors: Andreas Axen, Uppsala (SE); Gunnar Glad, Uppsala (SE); Henrik Ihre, Uppsala (SE); Anders Larsson, Uppsala (SE); Nils Norrman, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 0 days.

(21) Appl. No.: 12/093,229

(22) PCT Filed: Nov. 16, 2006

(86) PCT No.: PCT/SE2006/001307

§ 371 (c)(1),
(2), (4) Date: May 9, 2008

(87) PCT Pub. No.: WO2007/058599

PCT Pub. Date: May 24, 2007

(65) Prior Publication Data

US 2008/0249289 A1    Oct. 9, 2008

(30) Foreign Application Priority Data

Nov. 21, 2005   (SE) .................... 0502570

(51) Int. Cl.
    *B01D 15/08* (2006.01)
(52) U.S. Cl. .................... 210/635; 210/656; 210/198.2; 210/502.1; 502/404; 502/439; 521/33; 536/124
(58) Field of Classification Search .............. 210/635, 210/656, 679, 198, 2, 502.1; 502/404, 439; 521/33; 536/3, 112, 124
See application file for complete search history.

(56) References Cited

U.S. PATENT DOCUMENTS

| | | | | |
|---|---|---|---|---|
| 4,067,825 A * | 1/1978 | Hradil et al. | ........... | 521/32 |
| 5,447,870 A * | 9/1995 | Lau | ........... | 436/528 |
| 5,789,578 A * | 8/1998 | Burton et al. | ........... | 536/56 |
| 5,922,777 A * | 7/1999 | Van Rheenen | ........... | 521/28 |
| 6,027,650 A * | 2/2000 | Van Reis et al. | ........... | 210/656 |
| 6,117,326 A * | 9/2000 | Schure et al. | ........... | 210/635 |
| 6,428,707 B1 | 8/2002 | Berg et al. | | |
| 6,524,482 B2 * | 2/2003 | Bruening et al. | ........... | 210/651 |
| 6,602,990 B1 | 8/2003 | Berg | | |
| 2003/0153794 A1* | 8/2003 | Choudary et al. | ........... | 568/852 |
| 2004/0254066 A1* | 12/2004 | Ramarao et al. | ........... | 502/159 |
| 2008/0237124 A1* | 10/2008 | Axen et al. | ........... | 210/635 |
| 2008/0249289 A1* | 10/2008 | Axen et al. | ........... | 530/413 |

OTHER PUBLICATIONS

Arshady, R: Chimica e L'Industria 70(9), 70-75 (1988).
Hjeretn, S.: Biochim Biophys Acta 79(2), 393-398 (1964).
Johnston, S. T., et al.: J. Membr. Sci. 153 (1999) 271-179.

* cited by examiner

*Primary Examiner*—Ernest G Therkorn
(74) *Attorney, Agent, or Firm*—Yonggang Ji

(57) ABSTRACT

The present invention relates to method of manufacturing a sulphonate-functionalized (S-functionalized) cation exchanger, which method comprises reacting olefinic groups with bisulphite in the presence of at least one amine oxide, such as N-methyl morpholine oxide (NMO). The olefinic groups of the carrier may be allyl groups; which may be provided on extenders such as polyhydroxyfunctional polymers. In one embodiment, the carrier is made of agarose with improved flow pressure properties.

17 Claims, No Drawings

MANUFACTURE OF A CHROMATOGRAPHY MATRIX

CROSS-REFERENCE TO RELATED APPLICATIONS

This application is a filing under 35 U.S.C. § 371 and claims priority to international patent application number PCT/SE2006/001307 filed Nov. 16, 2006, published on May 24, 2007, as WO 2007/058599, which claims priority to patent application number 0502570-5 filed in Sweden on Nov. 21, 2005.

TECHNICAL FIELD

The present invention relates to the manufacture of chromatography matrices, and more specifically to an advantageous method of manufacturing cation exchangers. The invention also embraces a chromatography column comprising said matrix, and to the use thereof in a process of purification.

BACKGROUND OF THE INVENTION

In the chemical and biotech field, target compounds such as drug candidates commonly need to be separated from contaminating species originating from the process of manufacture. For example, a protein drug candidate which has been produced by expression of recombinant host cells will need to be separated e.g. from the cells and possibly cell debris, other host cell proteins, DNA, RNA, and residues from the fermentation broth such as salts. Due to its versatility and sensitivity to the target compounds, chromatography is involved as at least one step in many of the currently used biotech purification schemes. The term chromatography embraces a family of closely related separation methods, which are all based on the principle that two mutually immiscible phases are brought into contact. More specifically, the target compound is introduced into a mobile phase, which is contacted with a stationary phase. The target compound will then undergo a series of interactions between the stationary and mobile phases as it is being carried through the system by the mobile phase. The interactions exploit differences in the physical or chemical properties of the components of the sample.

The stationary phase in chromatography is commonly comprised of a solid carrier to which ligands, which are functional groups capable of interaction with the target compound, have been coupled. Consequently, the ligands will impart to the carrier the ability to effect the separation, identification, and/or purification of molecules of interest. Liquid chromatography methods are commonly named after the interaction principle utilised to separate compounds. For example, ion exchange chromatography is based on ionic charge-charge interactions; hydrophobic interaction chromatography (HIC) utilises hydrophobic interactions; and affinity chromatography is based on specific biological affinities.

Thus, ion exchange is based on the reversible interaction between a charged target compound and an oppositely charged chromatography matrix. The elution is most commonly performed by increasing the salt concentration, but changes in pH are equally possible. Ion-exchangers are divided into cation-exchangers, wherein a negatively charged chromatography matrix is used to adsorb a positively charged target compound; and anion-exchangers, wherein a positively charged chromatography matrix is used to adsorb a negatively charged target compound. The term strong ion exchanger is used for an ion-exchanger which is charged over broad pH intervals, while a weak ion-exchanger is chargeable at certain pH values only. One commonly used strong cation-exchanger comprises sulphonate ligands (known as S groups). In some cases, such cation exchangers are named by the group formed by the functional group and its linker to the carrier; for example SP cation exchangers wherein the S groups are linked by propyl (P) to the carrier.

The properties of the carrier to which the ligands have been coupled will also affect the separation properties of the chromatography matrix. Depending on the intended mode of chromatography, carriers that are substantially hydrophilic or hydrophobic may be preferred. A further consideration of the carrier is the ease of which it is functionalized. Depending on the chemistry used for coupling ligands, the carrier may be activated i.e. transformed into a more reactive form. Such activation methods are well known in this field, such as allylation of the hydroxyl groups of a hydrophilic carrier such as dextran or agarose. Covalent ligand attachment is typically achieved using reactive functionalities on the solid support matrix such as hydroxyl, carboxyl, thiol, amino groups, and the like. In order to enhance the binding capacity of the matrix, a linking group known simply as a linker is often provided between the ligand and carrier. Such linkers will physically distance the ligand from the carrier thereby permitting the target compound to interact with the ligand with minimal interference from the matrix. However, the use of linkers in the synthesis of chromatography matrices requires the use of a functional reagent having at least one functional group capable of reacting with a functional group on the surface of the matrix to form a covalent bond therewith and at least one functional group capable of reacting with a functional group on the ligand to form a covalent bond therewith.

U.S. Pat. No. 5,789,578 (Massey University) relates to methods for the preparation of chromatography matrices comprising a support matrix having ligands capable of binding a target compound covalently attached thereto through a linking group comprising sulfide, sulfoxide, or sulfone functionality. Bisulphite is used as a reagent to provide S groups. More specifically, U.S. Pat. No. 5,789,578 uses allyl glycidyl ether, allyl halide or propargyl halide and conventional methods in the presence of a base to provide a carrier having ethylenically unsaturated entities pendent thereto. Specifically, the halide or glycidyl group reacts with matrix hydroxyl groups at alkaline pH. Under these conditions, the allyl group is expected to have limited reactivity with the matrix or water used in the reaction solution. The unsaturated group is then reacted under free radical conditions with bisulphite or a thiol-containing ligand to provide for covalent linkage thereof.

However, the introduction of allyl groups and subsequent coupling of S groups as disclosed in the above discussed U.S. Pat. No. 5,789,578 will leave a fraction of the allyl groups unreacted on the carrier while another fraction will be subject to the introduction of vicinal sulphonate-sulphinate groups. In addition, the activated reagents will also involve the risk of undesired cross-linking reactions. Further, it is known that the kind of reaction described in U.S. Pat. No. 5,789,578 will be initiated by oxygen, which oxygen is consumed in a competing reaction transforming the bisulphite to bisulphate. During the formation of sulphonate radicals, sulphate ions are also formed, which cause a drop in pH. To avoid deleterious effects of this pH drop, the reaction is commonly neutralized by addition of sodium hydroxide solution. The reaction is relatively time-consuming, and may be run e.g. overnight.

Thus, there is a clear need in this field of improved methods which allows functionalization of polysaccharide carriers in simpler ways avoiding the above-discussed disadvantages.

BRIEF DESCRIPTION OF THE PRESENT INVENTION

One aspect of the present invention is to provide a novel method of manufacturing a chromatography matrix wherein the ligands comprise sulphonate groups. Thus, one aspect of the invention is to provide a method of manufacturing a sulphonate-functionalized cation exchanger. This can be achieved by the present invention as defined in the appended claims.

A specific aspect of the invention is to provide a method as described above, which avoids the requirement of oxygen addition commonly connected to bisulphite addition to double bonds. This can be achieved by a method wherein olefinic groups are reacted with bisulphite in the presence of an amine oxide, as defined by the appended claims.

An additional aspect of the invention is to provide a method as described above, which avoids the requirement of pH adjustment.

Yet another aspect is to provide a method of coupling sulphonate groups to a chromatography matrix, which is faster than the prior art methods.

Further details and advantages of the present invention will appear from the detailed description that follows.

Definitions

The term "target compound" means herein any compound, molecule or other entity one wishes to isolate from an aqueous solution. The target compound may be the desired product or an undesired contaminant in a liquid product.

The term "polysaccharide" includes as used herein natural polysaccharides, synthetic polysaccharides, polysaccharide derivatives, modified polysaccharides, and any mixture thereof.

The term "ligand" is used herein in its conventional meaning for an entity comprising a functional group capable of interaction with a target compound. Examples of groups of ligands are positively charged groups (anion exchange ligands); negatively charged groups (cation exchange ligands); hydrophobic groups; groups with a biological affinity for a specific target compound, such as the affinity of an antigen for an antibody (affinity ligands); etc.

The term "linker" means herein a group provided between carrier and ligand. The term "linker" is commonly used for a group introduced to provide the chemical functions required for the coupling of ligands to the carrier. The linker may comprise a few atoms to distance the coupling reactions from each other (linker to carrier and ligand to linker, respectively), and it may also comprise one or more hydrophilic or hydrophobic substituents. However, the linker is commonly a much shorter molecule than extenders, see below.

The term "extender" means herein a polymer, which has been tethered to the surface of the carrier and hence extends the distance between ligand and carrier. The primary function of an "extender" is to increase binding capacity and mass transport of the target molecules by increasing the available surface area and by providing flexible polymer chains for rapid surface diffusion and similar processes. Extenders are also known e.g. as "flexible arms", "tentacles" and sometimes "fluff".

The term "surface" means herein, in the context of porous carriers, both outer surfaces of the carrier and its pore surfaces.

DETAILED DESCRIPTION OF THE INVENTION

In a first aspect, the present invention relates to a method of manufacturing a sulphonate-functionalized (S-functionalized) cation exchanger, which method comprises reacting olefinic groups with bisulphite in the presence of at least one amine oxide.

In a first embodiment, the reaction is carried out in the presence of at least one tertiary amine oxide. In another embodiment, at least one amine oxide is a cyclic amine oxide, such as a cyclic tertiary amine oxide. In a specific embodiment, the reaction is carried out in a mixture of two or more amine oxides, such as the above-mentioned. The amine oxides used in the present method may be selected from the group consisting of N-methyl morpholine oxide (NMO); triethyl amine N-oxide; pyridine N-oxide; picoline N-oxide; dimethylpyridine N-oxide; dimethyl hexyl amine N-oxide; dimethyl heptyl amine N-oxide; dimethyl octyl amine N-oxide; dimethyl nonyl amine N-oxide; dimethyl decyl amine N-oxide; dimethyl undecyl amine N-oxide; dimethyl dodecyl amine N-oxide; dimethyl tridecyl amine N-oxide; dimethyl benzyl amine N-oxide; and quinoline N-oxide. In a specific embodiment, the amine oxides are selected from the group consisting of N-methyl morpholine oxide (NMO) and triethyl amine N-oxide. In one embodiment, the amount of added amine oxide is at least about 3%, preferably at least about 4%, and most preferably at least about 4.5%. In one embodiment, the pH is in the range of 5-8, such as 6-7.

Thus, in an advantageous embodiment, the reaction is carried out in the presence of N-methyl morpholine oxide (NMO), as defined by the following formula:

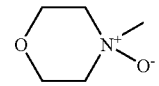

As is well known, NMO [(CH$_3$N(CH$_2$)$_2$O(CH$_2$)$_2$)] is a tertiary amine oxide, which is commonly used as a solvent for cellulose in textile fibre production, a catalyst or cross-linker in the production of polyurethane foams, elastomers and adhesives. NMO is commercially available, e.g. from BASF.

The present invention suggests for the first time the use of an amine oxide, such as N-methyl morpholine oxide (NMO), in the manufacture of a chromatography matrix. Thus, an advantage of the invention is that the oxygen required in the prior art method discussed above can be omitted in the present method, consequently avoiding the disadvantages connected therewith. Thus, in a specific embodiment, the amine oxide is used as the oxidant in a reaction between olefinic groups and bisulphite.

Without wishing to be bound to any specific theory, the present invention has been shown to provide a more efficient radical formation than oxygen, and it commonly brings the reaction to completion in a shorter time. Using NMO, a further advantage of the present method is that the decomposition product is N-methyl morpholine, which will work as a buffering agent during the reaction. Thus, there will be no need for pH adjustment during the present method.

In an advantageous embodiment of the present method, bisulphite is provided by adding sodium bisulphite to a reaction slurry comprising carrier in water. Sodium bisulphate is a commercially available chemical, which can easily be obtained for use in the present method.

In one embodiment, the olefinic groups are provided at the surface of a carrier. In an advantageous embodiment, the olefinic groups of the carrier are allyl groups. As discussed in the section Background above, allylation of chromatography carrier materials is well known in this field and easily performed by the skilled person. The nature of the carrier will be discussed in more detail below.

In an advantageous embodiment, the carrier is porous. This provides an enlarged surface area available as possible binding target compounds, which allows for higher binding capacities when used in chromatography. In this context, it is understood that the olefinic groups available for reaction are commonly present both on external surfaces of the carrier and on surfaces of the pores that present a sufficient size.

Another or additional way of increasing the surface area of a chromatographic carrier is to provide one or more extenders between carrier and ligand. Hydrophilic extenders may comprise functionalities selected from the group consisting of hydroxy, carboxy, amino, repetitive ethylene oxide ($-CH_2CH_2O-$), and amido. In one embodiment, the extenders comprise hydrophilic polymers, such as polysaccharides. Illustrative polysaccharide extenders are starch; cellulose, such as cellulose ethers, e.g. hydroxyethyl cellulose; dextran, such as L. Mesenteroides B-512; and agarose.

Polyhydroxyfunctional polymers, such as polysaccharides, are preferred extenders due to their hydrophilicity and ample supply of reactive hydroxyl groups both for tethering and for attachment of ligands. In one embodiment, the extender is a polysaccharide selected from the group consisting of cellulose ethers; dextran; starch and starch derivatives; hemicellulose; pectin; plant seed gum (e.g. locust bean gum or guar gum); plant exudate gum (e.g. gum arabicum); pullulan; scleroglucan; and xanthan.

Thus, in one embodiment, the carrier used in the present method has been grafted with dextran to provide extenders, in which case the olefinic groups will be provided on the dextran. For example, the hydroxyl groups of the dextran may be allylated according to well known methods. Thus, in one embodiment, the present method comprises a step of providing the polysaccharide gel with extenders before the reaction between olefinic groups with bisulphite in the presence of NMO. Dextran is readily available as a commercial product, e.g. from GE Healthcare (Uppsala, Sweden), and may be coupled to a polysaccharide carrier following well known methods. The most suitable molecular weight of dextran will depend on other conditions such as the pore size of the carrier, and may be in the range of 10-500 kDalton (kD), such as 20-70 kD. In an advantageous embodiment, the dextran has been derived from Leuconostoc mesenteroides, and is of molecular weight of about 40 kD. In one embodiment, the dextran is medium branched, meaning that about 5% of the glucose residues are branching points.

In an alternative embodiment, the extenders comprise synthetic polymers. Such synthetic polymers may be selected from the group comprising polyvinyl alcohols; polyacryl- and polymethacrylamides; FICOLL™ (a sucrose-epichlorohydrin molecule); polyvinyl ethers, such as hydroxyfunctional polyvinylethers; polyglycerols; hydroxyfunctional polyacrylamides; hydroxyfunctional polymethacrylates; polyglycidol; and ethoxylated polyols.

As understood by the skilled person, the length (size) of the optimal extender will depend on several factors, such as number of attachment points to the carrier, the nature of the extender, the structure and size of the ligand as well as the number thereof per extender molecule. The molecular weight of the present extenders may be above 500 D, preferably above 1000 D and most preferably in the 5-500 kD range.

In one embodiment, the extenders are coupled to the carrier by well known methods; and subsequently provided with olefinic groups reacted with bisulphite according to the invention. In an alternative embodiment, the olefinic groups reacted with the bisulphite in the method according to the invention are provided on extenders. In an advantageous embodiment, the extenders are coupled to a carrier after the reaction between olefinic groups and bisulphite. The attachment of extenders to the carrier is easily performed by the skilled person in this field, see e.g. U.S. Pat. No. 6,428,707 (Amersham Pharmacia Biotech AB), which is hereby included herein via reference.

The carrier used in the present method may be inorganic or organic, and it may be porous or non-porous.

In one embodiment, the carrier comprises organic polymers, preferably native polymers such as carbohydrates or polysaccharides. Thus, in an advantageous embodiment, the carrier comprises porous, cross-linked polysaccharide. In a specific embodiment, the polysaccharide has been prepared by a method that improves its rigidity and consequently its flow-pressure properties, sometimes denoted "high flow agarose". Thus, the first aspect of the invention also embraces a method that provides functionalized chromatography matrix as described above, wherein the carrier is made from any gelatable polysaccharide prepared by a method which improves its rigidity.

Thus, in a specific embodiment, the cross-linked carrier used in the present method is provided by:

(a) substituting part of the hydroxyl groups of a polysaccharide in aqueous solution;

(b) providing a carrier by gelling the polysaccharide solution; and (c) cross-linking the gel obtained by reacting hydroxyl groups of the polysaccharide.

In a first embodiment, in step (a), the substitution is carried out with any suitable group which is not susceptible to nucleophilic attack, also known as a "non-reactive group". By substitution with non-reactive groups, the stability of the polysaccharide will be improved and it is easier to control the subsequent cross-linking step. In one embodiment, the non-reactive groups are selected from the group consisting of ethers, esters, amides and xantates.

In an alternative embodiment, in step (a), the substitution is carried out with groups which are "reactive" in the present context, such as electrophilic groups or groups easily converted to electrophilic groups, such as e.g. allyl groups, epoxides, halohydrins, α,β-unsaturated carbonyls, which are all readily reactive with hydroxyl groups. Thus, in this embodiment, the substitution may be provided by adding a bifunctional cross-linking agent having one active site and one inactive site to a polysaccharide solution and allowing hydroxyl groups of the polysaccharide to react with the active site of the cross-linking agent; and the inactive site of the cross-linking agent is activated subsequent to the gelling of step (b); which activated site is then reacted with hydroxyl groups of the polysaccharide gel to cross-link the gel.

Consequently, in this embodiment, the method of manufacturing a chromatography matrix comprises in detail:

(a) adding a bifunctional cross-linking agent having one active site and one inactive site to a polysaccharide solution and allowing hydroxyl groups of the polysaccharide to react with the active site of the cross-linking agent;

(b) providing a carrier by gelling the polysaccharide solution, such as by cooling;

(c) activating the inactive site of the cross-linking agent;

(d) reacting the activated site so obtained with hydroxyl groups of the polysaccharide gel to cross-link the gel;

(e) providing the surface of the carrier with olefinic groups, preferably by allylation; and (f) reacting the olefinic groups so obtained with bisulphite in the presence of at least one amine oxide, such as NMO, to provide a sulphonate-functionalized (S-functionalized) cation exchanger.

The bifunctional cross-linking agent used in this alternative embodiment of the present method will comprise one active site and one inactive. In this context, the term "active site" means all groups capable of reaction with the hydroxyl groups of the polysaccharide. Examples of such groups are halides, epoxides, methylol groups. The term "inactive site" refers to a group which is not reactive under the same reaction conditions as the reactive site, but which can later on be activated to react with the hydroxyl groups of the polysaccharide. Thus, suitable cross-linking agents are selected from the group consisting of allylglycidyl ether and allylhalides, such as allylbromide; N-methylol acrylamide; vinyl benzylchloride; and cinnamoyl chloride. In one embodiment, the bifunctional cross-linking agent is selected from the group comprising allylglycidyl ether, allylbromide and epichlorohydrin. The so cross-linked gel can be further cross-linked by conventional methods as known by the state of the art. Further details regarding steps (a)-(d) in the method above may be as provided in U.S. Pat. No. 6,602,990 (Berg), which is hereby incorporated herein via reference.

As mentioned above, the carrier used in the present method may be an organic polymer such as a polysaccharide. Thus, in one embodiment, the carrier is made from a material selected from the group consisting of agarose, agar, cellulose, dextran, starch, pectin, chitosan, konjac, carrageenan, gellan, and alginate. In one embodiment, the carrier is selected from the group consisting of dextran and agarose. In an advantageous embodiment, the carrier is agarose. In a specific embodiment, the carrier is comprised of agarose gel, to which dextran extenders are coupled. In an alternative, specific embodiment, the carrier is comprised of dextran gel, to which dextran extenders are coupled. The polysaccharide carrier may have been prepared by any conventional method well known in this field. Non-functionalized chromatographic carriers are commercially obtainable, such as the product line SEPHAROSE™ (GE Healthcare, Uppsala, Sweden).

In an alternative embodiment, the carrier used in the present method is comprised of cross-linked synthetic polymers, such as styrene or styrene derivatives, divinylbenzene, acrylamides, acrylate esters, methacrylate esters, vinyl esters, vinyl amides etc. An advantage of using such synthetic polymers is that they will commonly already present residual olefinic groups such as vinyl or allyl groups useful to react with the bisulphite in the presence of NMO according to the invention, without the need of a preceding allylation step. Carriers made from such polymers are easily produced according to standard methods, see e.g. "Styrene based polymer supports developed by suspension polymerization" (R Arshady: Chimica e L'Industria 70(9), 70-75 (1988)). Alternatively, the carrier is a commercially available product, such as the product line SOURCE™ (GE Healthcare, Uppsala, Sweden). However, in this embodiment, the surface of the carrier is preferably modified to increase its hydrophilicity, usually by converting the majority of the exposed residual double bonds to hydroxyl groups, before allylation and coupling of the semi-synthetic heparin ligands.

Finally, the carrier may be made from an inorganic material, such as silica.

The carrier used in the present method may be of any suitable shape, such as particles, preferably essentially spherical particles, monoliths, membranes, filters, chips, capillaries or any other format.

In one embodiment of the present method, the carrier is comprised of particles, such as essentially spherical particles. Thus, in the method above, (b) comprises to prepare particles, e.g. by suspension gelation of the agarose solution in an organic phase. Such particles are easily prepared by the skilled person in this field by conventionally used methods, see e.g. (S Hjertén: Biochim Biophys Acta 79(2), 393-398 (1964). In a specific embodiment, the average diameter of the particles is below about 400 µm, such as below about 200 µm. Thus, illustrative ranges of particle diameters are 10-100 µm, such as 20-80 µm, e.g. 30-50 µm or 50-70 µm.

In an alternative embodiment, the porous carrier comprises a membrane. Suitable membrane carriers for functionalization according to the invention are easily prepared by the skilled person in this field; see e.g. S. T. Johnston, W. M. Deen: J. Membr. Sci. 153 (1999) 271-179 which describes agarose membranes.

In a second aspect, the present invention relates to a chromatography matrix manufactured by the method described above.

In another aspect, the present invention relates to a liquid chromatography column, which comprises sulphonate-functionalized (S-functionalized) carriers manufactured by reacting bisulphite with olefinic groups such as allyl groups of the carrier in the presence of at least one amine oxide, such as NMO. In one embodiment, the column comprises a sulphonate-functionalized (S-functionalized) cation exchanger manufactured as described above.

In a specific embodiment, the present column comprises a chromatography matrix prepared as described above. The column may be made from any conventional material, such as biocompatible plastic, e.g. polypropylene, steel, such as stainless steel, or glass. The column may be of a size suitable for laboratory scale or large-scale purification. In a specific embodiment, the column according to the invention is provided with luer adaptors, tubing connectors, and domed nuts. The chromatography matrix may be packed in the column, or provided as a fluidised bed.

In one embodiment, the chromatography column according to the invention is of the kind known as a "limited-use" chromatography column, which in this context means a packed chromatography column which is most suitable for a limited number of uses, such as 1-10 times. Such limited-use products are commercially known as "disposable products". In another embodiment, the chromatography comprising a matrix manufactured according to the present method is sterilized to provide a sterile disposable product. Thus, the method according to the invention may contain an additional step of providing the matrix in the column and sterilizing the packed or filled column.

In another aspect, the present invention relates to a process of isolating one or more target compounds, which comprises to pass a liquid comprising the target compound(s) across a porous sulphonate-functionalized (S-functionalized) chromatography matrix manufactured by reacting bisulphite with olefinic groups such as allyl groups of the carrier in the presence of NMO to adsorb the target compound(s); and recover said target compound(s) by contacting the chromatography matrix with an eluent. Thus, the present process is a method of cation exchange chromatography. In the most preferred embodiment, the chromatography matrix is as described above.

The principles of cation exchange chromatography are well known to those of skill in this field. Preferably, the chromatography matrix will be washed between adsorption and elution. As the skilled person in this field will realise, conventional buffers and conditions will be useful in this process. For a review of chromatography methods, see e.g. Protein Purification—Principles, High Resolution Methods and Applications (J. -C. Janson and L. Rydén, 1989 VCH Publishers, Inc.).

The process above may be used for isolation, such as separation or purification, of target compounds, such as biomolecules, such as proteins, e.g. monoclonal or polyclonal antibodies; peptides, such as dipeptides or oligopeptides; peptide nucleic acids; viruses; cells, such as mammalian or bacterial cells, prions etc. In an advantageous embodiment, the target compound is a protein and the method provides a substantially pure protein. In the most advantageous embodiment, the target compound is an immunoglobulin, such as IgG.

Alternatively, the process is used to isolate cationic organic molecules, such as drug candidates. In an alternative embodiment, the process is used to identify any one of the above discussed target compounds, e.g. for diagnostic purposes. In yet another embodiment, the process is used to purify products for the food and beverage industry, such as various proteins originating from whey, sugar and sweetener solutions, amino acid containing solutions. Thus, the products of the present process may be drugs or drug targets, such as antibody-based drugs or diagnostics; vectors for use in therapy, such as plasmids or viruses for use in gene therapy; feed supplements, such as functionalized food; diagnostic agents etc. A specific application of a molecule purified according to the invention is as a drug for personalized medicine.

Experimental Part

The present examples are provided for illustrative purposes only, and are not to be construed as limiting the scope of the invention as defined by the appended claims.

Materials and Methods

| Gels used in this study: |
|---|
| U101076A; HFA-Dextran-Allyl-SP |
| U1003081; HFA-Dextran-Allyl |
| U1003080; HFA-Dextran |
| U842060; HFA Base matrix |
| U1012072A; 6FF-Dextran-Allyl-SP |
| U1003083; 6FF-Dextran-Allyl |
| U1003082; 6FF-Dextran |

| 6FF Base matrix | |
|---|---|
| NMO (N-Methyl morpholine oxide) | Aldrich 50% in water |
| Q-salt (tert-Butyl ammonium HSO$_4$) | Aldrich 97% |
| DMSO (Di methyl sulphoxide) | Merck 99% |
| DMF (Di methyl formamide) | Merck |
| Urea | Merck Pro Anal. |
| Me-Pyrrolidone | Merck >99% |
| Me-Morpholine added | Lancaster 99% |
| Trimethyl amine N-oxide | Sigma |
| Triethyl amine | Aldrich |

Chromatography
Column: HR5/5 (GE Healthcare, Uppsala, Sweden)
Flow 1.0 mL/min (for IgG 0.5 mL/min).
Model protein concentration used: 4 mg/mL.

EXAMPLE 1

Preparation of Activated Agarose Carriers

Below, "HFA" or sometimes "HF Agarose" refers to High Flow Agarose manufactured according to the above discussed U.S. Pat. No. 6,602,990 (Berg), while SEPHAROSE™ 6FF is a commercially available product from GE Healthcare.

EXAMPLE 1a

Epoxidation of HFA and SEPHAROSE™ 6FF

| Gel (drained) | 750 ml |
|---|---|
| Dist. water | 375 ml |
| NaOH | 90 g |
| NaBH$_4$ | 1.5 g |

The components were mixed in a three-necked round-bottom flask. After about 30 minutes, 172.5 ml epichlorohydrin (ECH) was added. The reaction mixture was stirred for 2 hours at 30° C.

The reaction was stopped by neutralisation with concentrated HOAc and washed with water on a glass filter. This procedure gave an epoxy content of about 17 µmol/ml gel.

EXAMPLE 1b

Coupling of Dextran Extenders to HF-Agarose and SEPHAROSE™ 6FF 300 ml of dextran (T40; Mw 40000) was dissolved in 262.5 ml water in a three-necked round-bottom flask. 750 ml agarose gel epoxy-activated as described above and 112.5 ml dist. water were added.

The mixture was stirred in room temperature for 1 hour. Then 39.4 ml of NaOH (50%) and 0.4 g of NaBH$_4$ were added. The reaction mixture was stirred over night at 30° C. The reaction was stopped by neutralisation with concentrated HOAc and than washed with water on a glass filter.

EXAMPLE 1c

Allylation of the Extenders Provided on Agarose Carriers

HF Agarose, provided with dextran extenders as described above, was first allylated as follows. 700 g of HF agarose (drained gel) was sucked dry on a glass filter. As much as possible of the water was removed.

| Dried gel | ~525 g |
|---|---|
| NaOH 50% (by weight) | 350 ml |

The components were mixed in a three-necked round-bottom flask. After about 5 minutes, 70 ml of allyl glycidyl ether (AGE) was added. The round-bottom flask was heated with a thermostated water bath to 50° C. The reaction mixture was stirred over night (18 h). The reaction was stopped by neutralisation with concentrated HOAc and washed first with ethanol and then with water on a glass filter.

This procedure gave an allyl content of 181 µmol/ml

SEPHAROSE™ 6FF, provided with dextran extenders as described above, was then allylated:

| Dextran-SEPHAROSE™ 6FF | 700 g |
|---|---|
| Dist. water | 350 ml |
| NaOH | 203 g |
| NaBH$_4$ | 2.8 g |
| Na$_2$SO$_4$ | 91 g |

The components were mixed in a three-necked round-bottom flask at 50° C. After an hour when the salt was dissolved, 260 ml of allylglycidylether was added. The mixture was stirred over night at 50° C. The reaction was stopped by neutralisation with conc. HOAc and than washed with ethanol and then water on a glass filter.

This procedure gave an allyl content of 173 μmol/ml gel.

EXAMPLE 2

Coupling of Sulphonate Ligands in the Presence of Amine Oxide

SP-coupling was carried out, to allyl activated gels obtained as described above, as follows:

| | |
|---|---|
| Allyl-gel (drained gel) | 8 g |
| Distilled water | 2 mL |
| Na-bisulphite | 2.5 g |
| NMO; 4-Me-Morpholine-4-oxide, 50% in water | 1 mL |

Gel and water are mixed in a 20 mL scintillation vial, by angled rotation. Na-bisulphite was added and after one minute of mixing, the NMO was added. The vial was capped and the reaction mixture mixed over night at room temperature. After complete reaction, the SP coupled gel was washed with water on a glass filter.

EXAMPLE 3

Evaluation of SP Coupling

SP levels on HFA matrix was determined by titration according to well known methods. The total volume of the reaction slurry was approximately 10 mL.

The test showed that the addition of 1 mL (50%) N-methyl morpholine oxide (NMO) to HFA provided with dextran extenders as described above gave a value of conversion of allyls of 80% (lab ref 1012079).

SEPHAROSE™ 6FF with Extenders

SP levels on 6FF matrix was determined by titration according to well known methods. The total volume of the reaction slurry was approximately 10 mL.

The test showed that the addition of 1 mL (50%) N-methyl morpholine oxide (NMO) gave a conversion in the same range as above.

In the present example, the optimal amount of NMO present was also investigated. It was found that an addition of 2.4% NMO was sufficient to improve the conversion of allyl groups into SP groups from 58% to 80% without optimising any other parameters (data not shown).

EXAMPLE 4

Testing of Other Amine Oxide than NMO

In this example, the effect of adding tri-ethyl amine N-oxide was investigated. HFA provided with dextran extenders was used, and the total volume of the reaction slurry was approximately 10 mL.

It was found that the addition of 1.5 mL triethyl amine N-oxide gave a value of the conversion of allyls of 80% (lab ref 1012095D).

EXAMPLE 5

SP Coupling to HFA Without Extenders

Also in for HFA matrix with no dextran as extender, it was possible to increase the yields of SP groups when using NMO as additive:

| Lab. journal page | Matrix | Coupling conditions | Conversion of allyl groups |
|---|---|---|---|
| 1012094B | HFA-allyl (320 μmol) | Standard | 56% |
| 1012094A | HFA-allyl (320 μmol) | Standard + 8.3% NMO | 73% |

EXAMPLE 6

Chromatography

For selected HFA matrix with SP groups introduced according to the invention, the dynamic protein capacity was analysed by a standard chromatographic method. The results were compared with the corresponding results for manufactured SP gels based on the SEPHAROSE™ 6FF matrix. The results are presented in the Table below:

| Matrix | Coupling conditions | Capacity for BSA. 20 mM acetate pH 4 | Capacity for IgG. 50 mM acetate pH 4.75 | Capacity for Lysozyme. 50 mM acetate pH 4.75 |
|---|---|---|---|---|
| 6FF SP (manufactured) | — | 60 mg/mL gel | 32 mg/mL gel | 32 mg/mL gel |
| 6FF-XL-SP (manufactured) | — | 14 mg/mL gel | 108 mg/mL gel | 192 mg/mL gel |
| HFA-XL-allyl 1012089A | standard + 4.5% NMO | 23 mg/mL gel | 16 mg/mL gel | 68 mg/mL gel |
| HFA-XL-allyl 1012089C | standard + 14.3% NMO | 27 mg/mL gel | 16 mg/mL gel | 71 mg/mL gel |
| HFA-XL-allyl 1012076A | standard | N.D. | 18 mg/mL gel | 71 mg/mL gel |
| HFA-allyl 1012094B | standard | 21 mg/mL gel | 10 mg/mL gel | 68 mg/mL gel |

Protein capacities determined as QB10 values.
N.D. = not determined.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

The invention claimed is:

1. A method of manufacturing a suiphonate-functionalized (S-functionalized) cation exchanger, which method comprises reacting olefinic groups with bisulphite in the presence of at least one amine oxide.

2. The method of claim 1, wherein the amine oxide is N-methyl morpholine oxide (NMO).

3. The method of claim 1, wherein the bisulphite is provided by adding sodium bisulphite to a reaction slurry comprising carrier in water.

4. The method of claim 1, wherein the olefinic groups are allyl groups.

5. The method of claim 1, wherein the olefinic groups reacted with the bisulphite are provided at the surface of a carrier.

6. The method of claim 5, wherein the olefinic groups have been coupled to the carrier via extenders.

7. The method of claim 1, wherein the olefinic groups reacted with the bisulphite are provided on extenders.

8. The method of claim 7, wherein the extenders are coupled to a carrier after the reaction between olefinic groups and bisulphite.

9. The method of claim 7, wherein the extenders comprise at least one polyhydroxyfunctional polymer, such as dextran.

10. The method of claim 5, wherein said carrier is comprised of cross-linked polysaccharide polymers.

11. The method of claim 10, wherein the cross-linked carrier is provided by:
    (a) substituting part of the hydroxyl groups of a polysaccharide in aqueous solution;
    (b) providing a carrier by gelling the polysaccharide solution; and
    (c) cross-linking the gel obtained by reacting hydroxyl groups of the polysaccharide.

12. The method of claim 11, wherein the substitution is provided by adding a bifunctional cross-linking agent having one active site and one inactive site to a polysaccharide solution and allowing hydroxyl groups of the polysaccharide to react with the active site of the cross-linking agent; and the inactive site of the cross-linking agent is activated subsequent to the gelling of step (b); which activated site is then reacted with hydroxyl groups of the polysaccharide gel to cross-link the gel.

13. The method of claim 10, wherein the polysaccharide is selected from the group consisting of agarose and dextran.

14. The method of claim 13, wherein the polysaccharide is agarose.

15. The method of claim 10, wherein the carrier is porous.

16. The method of claim 10, wherein the carrier is comprised of essentially spherical particles.

17. The method of claim 10, wherein the carrier is a membrane.

* * * * *